(12) United States Patent
Opfer et al.

(10) Patent No.: US 6,270,140 B1
(45) Date of Patent: Aug. 7, 2001

(54) REMOVABLE SEAT

(75) Inventors: John G. Opfer, Rochester Hills; Terrence Duncan, Kentwood; Leslie Griswold, Whitmore Lake; David G. Anticuar, West Bloomfield; Lawrence A. Fieroh, Troy, all of MI (US)

(73) Assignee: Johnson Controls Technology Corporation, Plymouth, MI (US)

( * ) Notice: Subject to any disclaimer, the term of this patent is extended or adjusted under 35 U.S.C. 154(b) by 0 days.

(21) Appl. No.: 09/463,074

(22) PCT Filed: Jul. 16, 1998

(86) PCT No.: PCT/US98/14644

§ 371 Date: Apr. 13, 2000

§ 102(e) Date: Apr. 13, 2000

(87) PCT Pub. No.: WO99/03702

PCT Pub. Date: Jan. 28, 1999

Related U.S. Application Data

(60) Provisional application No. 60/052,901, filed on Jul. 16, 1997.

(51) Int. Cl.[7] .................................................. B60N 2/06
(52) U.S. Cl. .................................. 296/65.03; 246/65.13; 246/65.09; 246/65.11
(58) Field of Search .............................. 296/65.03, 65.13, 296/65.09, 65.11, 65.14; 297/344.1, 331, 336, 344.14, 344.24; 248/503.1

(56) References Cited

U.S. PATENT DOCUMENTS

| | | |
|---|---|---|
| 193,459 | 7/1877 | Payne . |
| 1,087,003 | 2/1914 | Engel . |
| 1,752,368 | 4/1930 | Brunn . |
| 2,678,681 | 5/1954 | Haltenberger . |
| 3,258,289 | 6/1966 | Malinowski . |
| 4,354,791 * | 10/1982 | Antonellis ..................... 296/65.11 X |
| 4,807,932 | 2/1989 | Hong . |
| 5,039,155 | 8/1991 | Suman et al. . |
| 5,286,084 | 2/1994 | Bart . |
| 5,516,194 | 5/1996 | Maule . |
| 5,636,884 * | 6/1997 | Ladetto et al. ..................... 296/65.13 |
| 5,711,505 * | 1/1998 | Nemoto ............................. 296/65.03 |
| 5,741,046 * | 4/1998 | Leuchtmann et al. ........ 296/65.09 X |
| 5,911,465 * | 6/1999 | Yamamoto et al. ............... 296/65.03 |
| 6,429,405 * | 10/2000 | Miyahara et al. ................ 296/65.11 |

FOREIGN PATENT DOCUMENTS 556385   4/1923   (FR) .

* cited by examiner

Primary Examiner—D. Glenn Dayoan
Assistant Examiner—Jason Morrow
(74) Attorney, Agent, or Firm—Foley & Lardner

(57) ABSTRACT

A vehicle seating structure allowing the removal of a seat assembly through an opening (72) of a vehicle having a track (26) secured to the body of the vehicle, the track coordinated with the opening such that the seat assembly (10) includes a coupling device (30) which slidably engages the track, thereby allowing the seat assembly to be displaced along the track and pass through the opening.

34 Claims, 3 Drawing Sheets

REMOVABLE SEAT

CROSS REFERENCE TO RELATED APPLICATION

This application claims the benefit of prior provisional application No. 60/052,901, filed Jul. 16, 1997.

BACKGROUND OF THE INVENTION

1. Technical Field

This invention generally relates to a seat which is removable from a vehicle and, more particularly. to a seat which engages a track aligned with and generally perpendicular to a door opening which allows the seat to be removed through the door opening when extended beyond the end of the track.

2. Discussion

Seats which are removable from a vehicle are known in the industry within certain vehicle types. Particularly, removable seats have been incorporated in vans which are intended to serve a dual purpose, that of cargo carrying and that of passenger transport. While some advancements have been made to improve the ease with which the seats may be removed, the task is still often difficult and awkward. Typically, the person removing the seats must release a latch mechanism mounted to the seat which engages a striker bar connected to a recess in the vehicle floor. Once released. the seat is lifted from the recesses and is free from the vehicle at that point. The seat must then be lifted by the person removing the seat as they exit the vehicle. The lifting motion is often difficult because the person must bend to avoid hitting the roof of the vehicle as they lift the seat. Some manufacturers have reduced the difficulty of removing the seat by placing rollers on the bottom of the seat stations, however, the seat must still be lifted out of the recesses and angled such that the wheels contact the floor of the vehicle while rolling them toward the opening.

The present invention is intended to provide a user friendly removable seat which minimizes the operator's difficulty during removal.

SUMMARY OF THE INVENTION

In accordance with the teachings of the present invention, there is provided a removable seat slidably engaging a track mounted to the vehicle. The track is generally perpendicular to and aligns with the door opening of the vehicle such that the operator is able to remove the seat while primarily standing on the exterior of the vehicle. In accordance with a preferred embodiment of the present invention, the seat can be folded to a more compact configuration than when in the normal use position. Once the seat is in the folded configuration it can pass through the door opening of the vehicle with relative ease.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature and is in no way intended to limit the invention, or its application, or uses.

Figure 1:
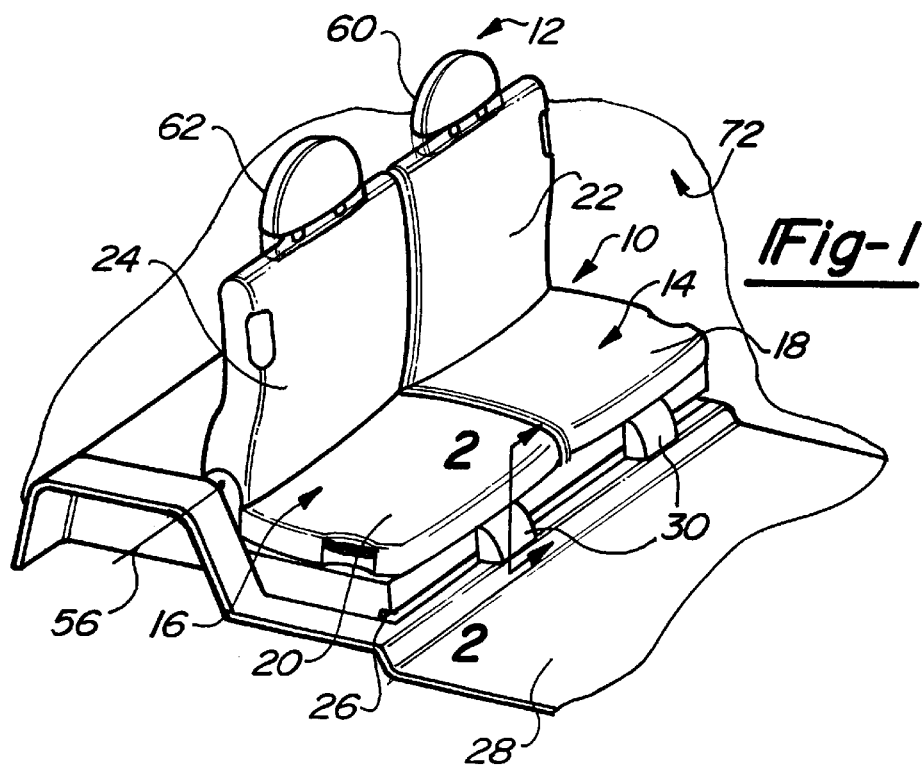
FIG. 1 is a perspective view of a removable seat made in accordance with the teachings of the present invention and shown in the normal use position.

Referring to FIG. 1, seat assembly 10 is shown with a vehicle body 12. Seat assembly 10 is shown as a 60/40 split seat having a driver side seat portion 14 and a passenger side seat portion 16. Each seat portion, 14 and 16, includes a seat cushion 18 and 20, respectively, and seat backs 22 and 24, respectively. While the preferred embodiment of the present invention will be described as a 60/40 split bench seat, other seating arrangements such as a full width bench seat, separate and individual seating units (typically referred to as bucket seats), and seats having three or more sections are also specifically included within the scope of the present invention.

Portions 14 and 16 are shown in a normal use position wherein an occupant would normally be seated in the seat while in this configuration. A track 26 is provided in or on the floor pan 28 of the vehicle body 12. Track 26 in the preferred embodiment is shown to be mounted on, or provided in, a generally vertical portion of floor pan 28. Further, track 26 can be located on a generally horizontal portion of floor pan 28, or at some inclined angle between horizontal and vertical surfaces of floor pan 28.

Track 26 can be secured to floor pan 28 by a number of methods known in the industry. Such methods include, but are not limited to: screws; bolts; welding; bonding; and the like. Further, track 26 can be mounted or secured below the surface of floor pan 28 with a coordinated slot or groove provided to enable track 26 to properly interface with connecting pieces as described below.

Figure 2:
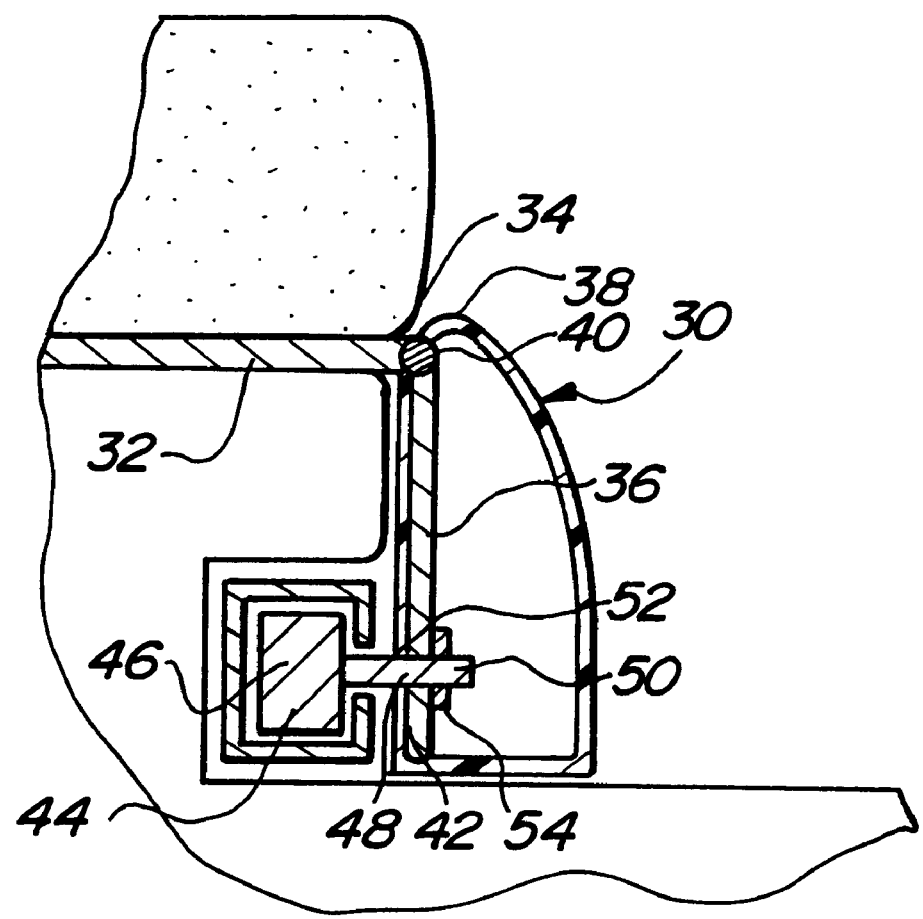
FIG. 2 is a detailed sectional view taken along line 2-2 in FIG. 1.

With additional reference to FIG. 2, an interconnecting assembly 30 is shown attached to seat cushion 20 and engaging track 26. Assembly 30 includes a first segment 32 connected to a forward lower edge 34 of seat cushion 20. First segment 32 is pivotally connected to a second segment 36 about hinge 38 having axis 40 running therethrough. A distal end 42 of second segment 36 provides attachment for track engagement member 44. Engagement member 44 in the preferred embodiment includes a roller 46 mounted for rotation about a shaft 48 having a threaded portion 50 thereon. A radially extending shoulder 52 is located on shaft 48 and acts in conjunction with retainer 54 to secure second segment 36 to the shaft. While track engagement member 44 in the preferred embodiment is as described. Other engagement member structures can be used with equal result. Sliding block type members made of steel or plastic, particularly a self-lubricating type plastic, can be utilized in place of the above described engagement member as one non-limiting example. Further, engagement member structures using a plurality of rollers which are either oriented to coordinate with one another or are oriented to provide retention and reduce frictional resistance, can also be utilized. The track can also provide bearings to support and reduce friction when a sliding block member is used.

Figure 3:
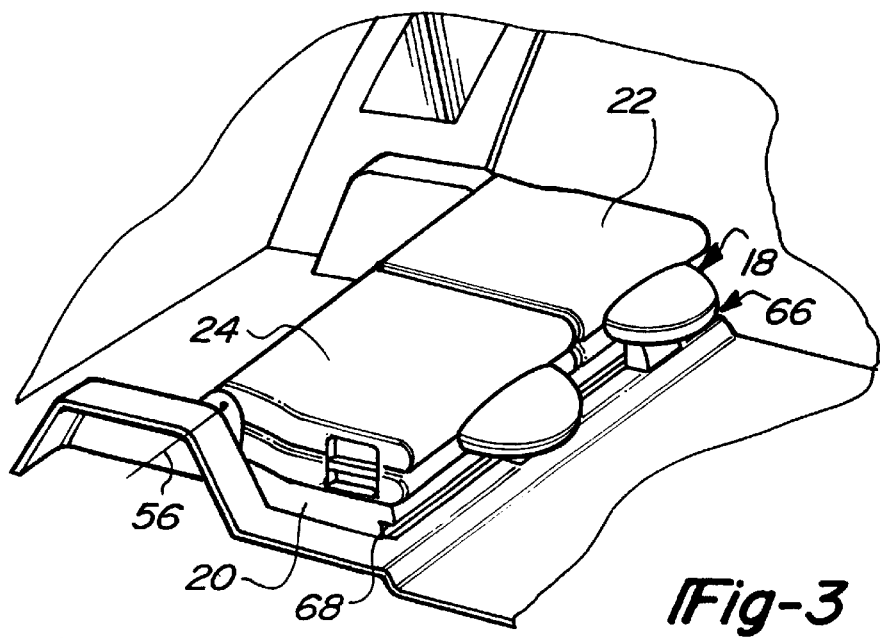
FIG. 3 is a perspective view of the removable seat in a first folded position.

Referring to FIG. 3, seat backs 22 and 24 are shown in a first folded position in which seat backs 22 and 24 pivot about axis 56 and overlie seat cushions 18 and 20, respectively. Seat backs 22 and 24 are pivotally connected to seat cushions 18 and 20 about axis 56 and may include a recline mechanism (not shown) allowing the angle of the seat backs to be varied when in the normal use position. One of many lock devices known within the industry can be used to retain seat backs 22 and 24 in their upright position relative to seat cushions 18 and 20 and such a device can be incorporated in the recline mechanism as known in the industry.

Figure 4:
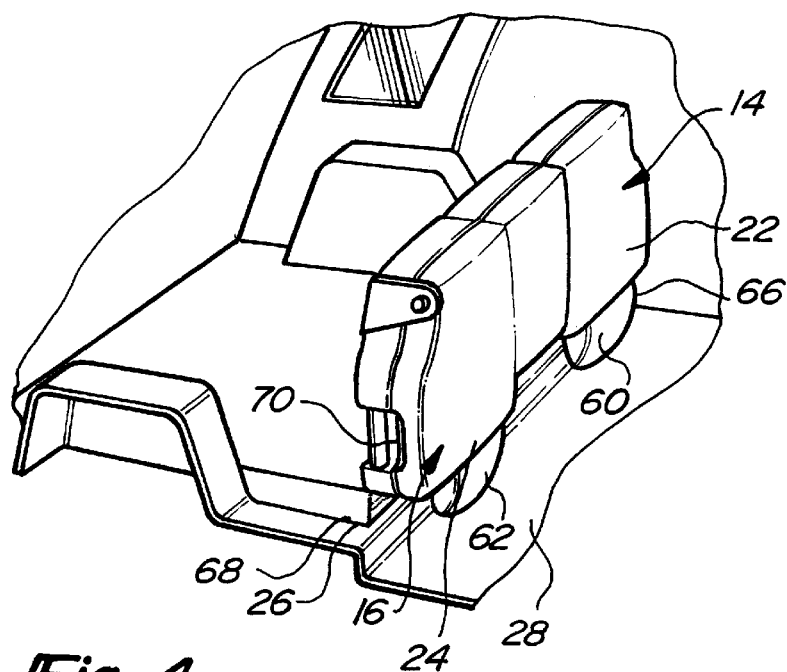
FIG. 4 is a perspective view of the removable seat in a vertically rotated position.
Figure 5:
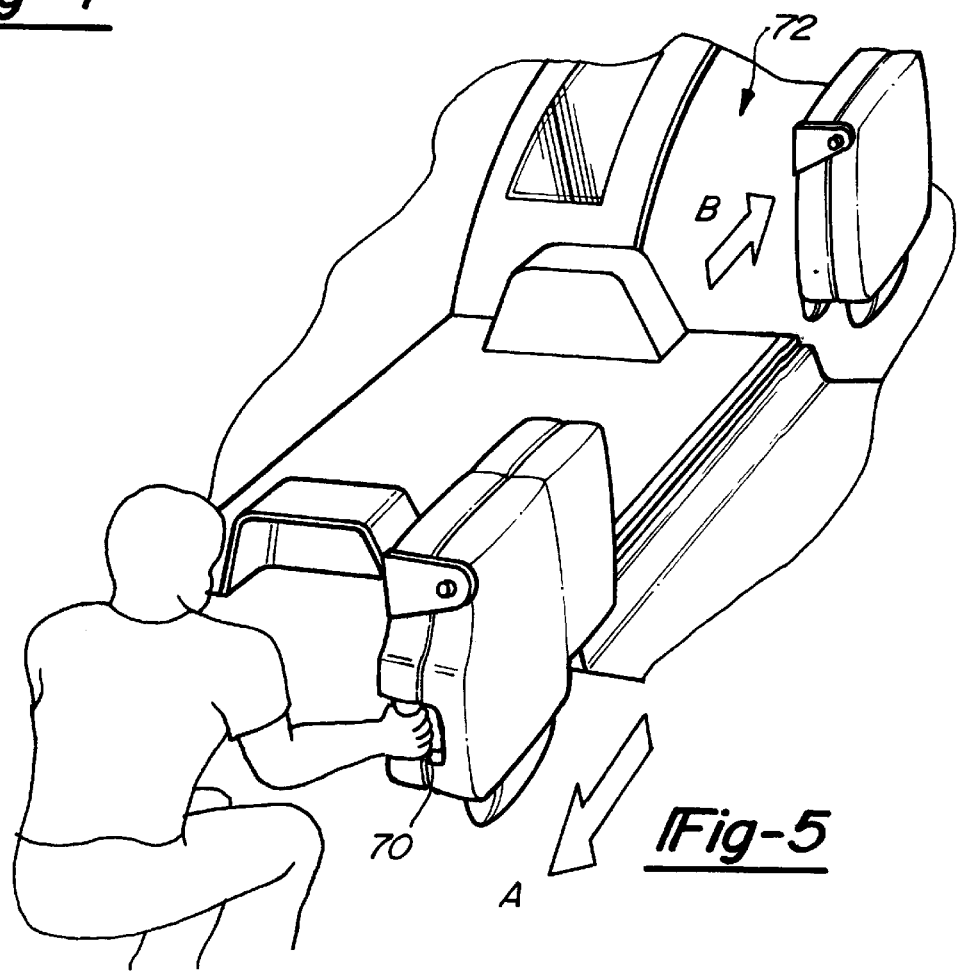
FIG. 5 is a perspective view of the removable seats when removed through the door opening of a vehicle.

With reference to FIG. 4 driver side seat portion 14 and passenger side seat portion 16 are shown rotated upwardly and forwardly about axis 40 (shown in FIG. 2) to a generally vertical position. As a result, the seat backs 22 and 24 are now inverted with the headrest 60 and 62 directed toward floor pan 28. Once seat portions 14 and 16 have been folded to the position shown in FIG. 4, seat portions 14 and 16 can be moved laterally along track 26 as shown by arrows "A" and "B" in FIG. 5. As each track engagement member 44 exits a distal end 66 and 68 of track 26, seat portions 14 and 16 are removed through an opening 72 (passenger side body opening not shown for simplicity) of vehicle body 12. In the preferred embodiment, each seat portion 14 and 16 includes a handle 70 along an outboard side for ease in handling the seat portion during removal and for carrying the seat portions following removal.

Reinstalling the seat portions into the vehicle can be accomplished by reversing the process described above. Further, while a single interconnecting assembly 30 was shown for each seat portion it is within the scope of the present invention to provide multiple interconnecting assemblies. For example, one interconnecting assembly could be located on an inboard corner of each seating portion with a second interconnecting assembly located on each outboard corner of the seat portion. Further, a lateral retention device can be incorporated in the interconnecting assembly or can be separate from the seating portion and attached to the vehicle body in proximity to track 26. The lateral retention device inhibits or prevents the seat portion from lateral movement within the track when engaged, and allows for movement of or removal of the seat portion when disengaged.

While the preferred embodiment is described as allowing the seats to be removed from openings located in the side of the vehicle, it is within the scope of the present invention to provide tracks extending longitudinally in the vehicle if an opening is provided at a front or rear end of the vehicle. One particular non-limiting example is if the present invention is incorporated in a van having an opening at the rear of the van.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A vehicle seating system for a vehicle allowing for the removal of a seat assembly through an opening of the vehicle, said system comprising:
a seat assembly including a generally horizontal seat cushion and a seat back pivotally connected to said seat cushion, said seat back extending generally upright in relation to said seat cushion, whereby said seat back may be folded over said seat cushion,
an interconnecting member coupled to said seat assembly;
a stationary track secured to the vehicle body, said track being located in coordination with an opening in the vehicle; and
wherein said interconnecting member of said seat assembly directly and slidably engages said stationary track thereby allowing said seat assembly to be displaced along said stationary track and pass through the opening in the vehicle.

2. The vehicle seating system of claim 1, wherein said opening is located on a side of the vehicle.

3. The vehicle seating system of claim 1, wherein said seat assembly further includes a handle.

4. A vehicle seating system for a vehicle allowing for the removal of a seat assembly through an opening of the vehicle, said system comprising:
a seat assembly including a generally horizontal seat cushion and a seat back extending generally upright in relation to said seat cushion, wherein said seat assembly may be rotated upwardly and forwardly to a generally vertical position;
an interconnecting member coupled to said seat assembly;
a stationary track secured to the vehicle body, said track being located in coordination with an opening in the vehicle; and
wherein said interconnecting member of said seat assembly directly and slidably engages said stationary track thereby allowing said seat assembly to be displaced along said stationary track and pass through the opening in the vehicle.

5. The vehicle seating system of claim 4, wherein said seat back is pivotally connected to said seat cushion, whereby said seat back may be folded over said seat cushion.

6. The vehicle seating system of claim 4, wherein said track is secured to the vehicle by a weld.

7. A vehicle seating system for a vehicle allowing for the removal of a seat assembly through an opening of the vehicle, said system comprising:
a seat assembly including a 60/40 split bench seat, a generally horizontal seat cushion and a seat back extending generally upright in relation to said seat cushion;
an interconnecting member coupled to said seat assembly;
a stationary track secured to the vehicle body, said track being located in coordination with an opening in the vehicle; and
wherein said interconnecting member of said seat assembly directly and slidably engages said stationary track thereby allowing said seat assembly to be displaced along said stationary track and pass through the opening in the vehicle.

8. The vehicle seating system of claim 7, wherein said seat assembly may be rotated upwardly and forwardly to a generally vertical position.

9. The vehicle seating system of claim 7, wherein said seat assembly further includes a handle.

10. A vehicle seating system for a vehicle allowing for the removal of a seat assembly through an opening of the vehicle, said system comprising:
a stationary track secured to the vehicle body, said track being located in coordination with an opening in the vehicle;
a seat assembly including a generally horizontal seat cushion and a seat back extending generally upright in relation to said seat cushion;
an interconnecting member coupled to said seat assembly, said interconnecting member including a first segment connected to a forward edge of said seat cushion; and a second segment pivotally connected to said first segment about a hinge, wherein a distal end of said second segment operably connects with a track engagement member;

wherein said interconnecting member of said seat assembly directly and slidably engages said stationary track thereby allowing said seat assembly to be displaced along said stationary track and pass through the opening in the vehicle.

11. The vehicle seating system of claim 10, wherein said track engagement member comprises a roller mounted for rotation about a shaft.

12. The vehicle seating system of claim 10, wherein said track engagement member comprises a sliding block type member.

13. The vehicle seating system of claim 12, wherein said sliding block type member is comprised of a self lubricating plastic.

14. A vehicle seating system for a vehicle allowing for the removal of a seat assembly through an opening of the vehicle, said system comprising:
 a seat assembly including a generally horizontal seat cushion and a seat back extending generally upright in relation to said seat cushion, said seat assembly further including an interconnecting member;
 a stationary track secured by a weld to the vehicle body, said track being located in coordination with an opening in the vehicle; and
 wherein said interconnecting member of said seat assembly directly and slidably engages said stationary track thereby allowing said seat assembly to be displaced along said stationary track and pass through the opening in the vehicle.

15. The vehicle seating system of claim 14, wherein said track is secured below the floor of the vehicle with a coordinated slot therein.

16. The vehicle seating system of claim 14, further comprising a plurality of said interconnecting members.

17. A vehicle seating system for a vehicle allowing for the removal of a seat assembly through an opening of the vehicle, said system comprising:
 a seat assembly including a generally horizontal seat cushion and a seat back extending generally upright in relation to said seat cushion, said seat assembly further including an interconnecting member;
 a stationary track secured by a bolt to the vehicle body, said track being located in coordination with an opening in the vehicle; and
 wherein said interconnecting member of said seat assembly directly and slidably engages said stationary track thereby allowing said seat assembly to be displaced along said stationary track and pass through the opening in the vehicle.

18. The vehicle seating system of claim 17, wherein said track is secured below the floor of the vehicle with a coordinated slot therein.

19. The vehicle seating system of claim 17, further comprising a plurality of said interconnecting members.

20. A vehicle seating system for a vehicle allowing for the removal of a seat assembly through an opening of the vehicle, said system comprising:
 a seat assembly including a generally horizontal seat cushion and a seat back extending generally upright in relation to said seat cushion, said seat assembly further including an interconnecting member;
 a stationary track secured below the floor of the vehicle body with a coordinated slot therein, said track being located in coordination with an opening in the vehicle; and
 wherein said interconnecting member of said seat assembly directly and slidably engages said stationary track thereby allowing said seat assembly to be displaced along said stationary track and pass through the opening in the vehicle.

21. The vehicle seating system of claim 20, wherein said track is secured to the vehicle by a weld.

22. The vehicle seating system of claim 20, wherein said track is secured to the vehicle by a bolt.

23. A vehicle seating structure allowing the removal of a seat assembly through an opening on a rear surface of a vehicle comprising:
 a stationary track secured to a body of the vehicle, said stationary track located in coordination with said opening; and
 wherein said seat assembly includes a coupling member which is directly and slidably engaged with said stationary track, thereby allowing said seat assembly to be displaced along said stationary track and pass through said opening.

24. The vehicle seating system of claim 23, wherein said seat assembly includes a generally horizontal seat cushion and a seat back which are pivotally coupled, and wherein said seat back may be folded over said seat cushion.

25. The vehicle seating structure of claim 23, wherein said coupling member comprises a roller coupled to said track.

26. A vehicle seating structure allowing the removal of a seat assembly through an opening of a vehicle comprising:
 a stationary track secured to a body of the vehicle, said stationary track located in coordination with said opening;
 wherein said seat assembly includes a generally horizontal seat cushion and a seat back which are pivotally coupled, and wherein said seat back may be folded over said seat cushion; and
 wherein said seat assembly further includes a coupling member which is directly and slidably engaged with said stationary track, thereby allowing said seat assembly to be displaced along said stationary track and pass through said opening.

27. The vehicle seating system of claim 26, wherein said opening is located on a side of the vehicle.

28. The vehicle seating system of claim 26, wherein said opening is located on a rear surface of the vehicle.

29. A vehicle seating structure allowing the removal of a seat assembly through an opening of a vehicle comprising:
 a stationary track secured to a body of the vehicle, said stationary track located in coordination with said opening;
 wherein said seating assembly may be rotated upwardly and forwardly to a generally vertical position; and
 wherein said seat assembly includes a coupling member which is directly and slidably engaged with said stationary track, thereby allowing said seat assembly to be displaced along said stationary track and pass through said opening.

30. The vehicle seating system of claim 29, wherein said seat assembly further includes a handle.

31. The vehicle seating system of claim 29, wherein said seat assembly further includes a 60/40 split bench seat.

32. A vehicle seating structure allowing the removal of a seat assembly through an opening of a vehicle comprising:
 a stationary track secured to a body of the vehicle, said stationary track located in coordination with said opening; and
 wherein said seat assembly includes a coupling member comprising a self lubricating sliding block which is directly and slidably engaged with said stationary track, thereby allowing said seat assembly to be displaced along said stationary track and pass through said opening.

33. The vehicle seating structure of claim 33, wherein said seat assembly includes a generally horizontal seat cushion and a seat back which are pivotally coupled, and wherein said seat back may be folded over said seat cushion.

34. The vehicle seating structure of claim 32, wherein said seat assembly may be rotated upwardly and forwardly to a generally vertical position.

* * * * *